(No Model.)
W. A. EDDY.
HAND CART.
No. 430,205. Patented June 17, 1890.
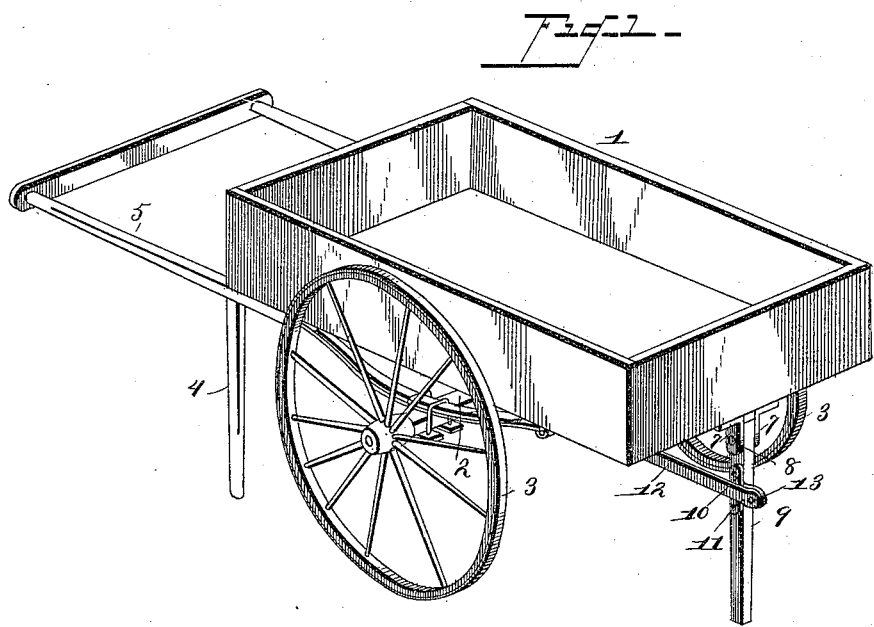
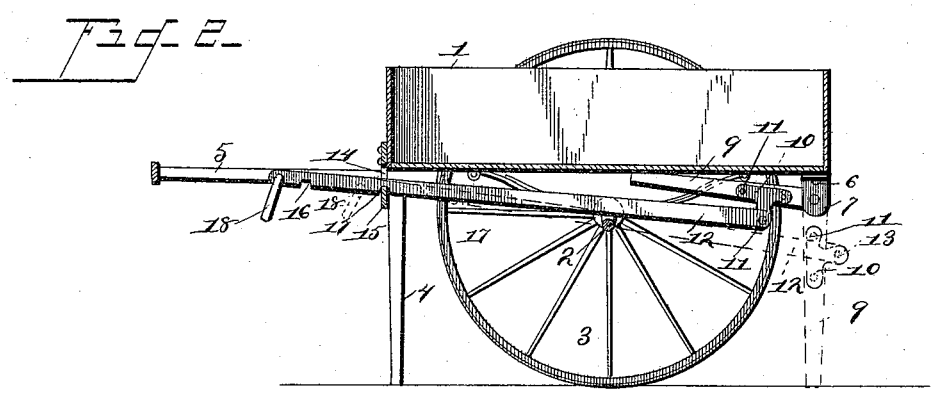
Witnesses:
Geo. E. Frech.
W. S. Duvall
Inventor
Walton A. Eddy.
By his Attorneys
C. A. Snow & Co.

UNITED STATES PATENT OFFICE.

WALTON ALMY EDDY, OF RANDOLPH, NEW YORK.

HAND-CART.

SPECIFICATION forming part of Letters Patent No. 430,205, dated June 17, 1890.

Application filed January 23, 1890. Serial No. 337,783. (No model.)

*To all whom it may concern:*

Be it known that I, WALTON ALMY EDDY, a citizen of the United States, residing at Randolph, in the county of Cattaraugus and State of New York, have invented a new and useful Hand-Cart, of which the following is a specification.

This invention has relation to improvements in hand-carts, the object in view being to provide a third leg for the cart, whereby the forward end of the same may be substantially supported during the reception or discharge of the cargo, and, furthermore, to provide a simple and convenient means of throwing said leg into and out of position from the rear end of the cart, and for locking said leg in either one of its positions.

With the above objects in view the invention consists in certain features of construction hereinafter specified, and particularly pointed out in the claims.

Referring to the drawings, Figure 1 is a perspective of a road-cart constructed in accordance with my invention, the leg being in position to support the cart. Fig. 2 is a central vertical section of the same, the leg being folded or elevated out of position.

Like numerals of reference indicate like parts in all the figures of the drawings.

The cart-body 1 is provided with the usual axle 2, wheels 3, rear supporting-legs 4, and the handles 5, by which the same is propelled by the attendant, all these being of the usual construction and forming no part of my present invention.

To the under surface of the cart, at its center and rear end, there is secured by screws or bolts 6 a pair of L-shaped angle-irons or ears 7, which depend in parallelism, and through which is passed a bolt 8, upon which is pivoted the upper end of a supporting-leg 9 of a length adapted to reach to the ground. By pivoting the leg in the position mentioned the same may be extended in a lower vertical position to form a support for the rear end of the cart; or when the cart is in motion said leg may be folded up under the bottom of the cart and out of the way and where not liable to come into contact with any obstruction upon the roadway.

Secured to the leg below its pivot is a T-shaped arm 10, the T end thereof being bolted, as at 11, to the leg, and the shank of the arm being provided with the perforation near its extremity, which shank extends outwardly from the leg, as shown. A rod 12 is located under the cart and has its forward end pivoted by a bolt 13 to the perforation in the shank of the T, the rear end of the rod being loosely supported and adapted to be reciprocated in a slot 14, formed in a plate 15, secured to the rear wall of the cart and depending below the bottom thereof, and through the end of the rod there is passed an ordinary operating-ring 18, forming a convenient hand-hold for the operator. The under edge of the rod is provided with two notches 16 and 17, the rear notch 16 being designed to interlock or receive the lower edge of the slot when the leg is in a vertical position, and thus maintain the same in said position, and the remaining notch 17 being designed to receive the lower edge of the slot when the operating-rod has been moved or reciprocated to the rear to elevate the leg and bring the same to a raised or inoperative position under the cart-body.

From the above description the operation of the invention will be at once apparent, and it will be seen that the leg may be locked by the notched rod in either a raised or lowered position.

An advantage arising from the employment of the T-shaped arm is that I thereby avoid any liability of the leg and arm getting into parallelism when the leg is elevated, whereby to lower the same would be difficult and sometimes impossible without stepping around to the front of the cart and grasping the leg by hand. By the T-arm it will be observed that the pivot-point is always below the pivot-point of the leg and it is impossible for the two points of the pivot to align.

Having thus described my invention, what I claim is—

1. The combination, with the body of a two-wheeled push-cart, of a supporting-leg hinged at the front end thereof and designed to swing inwardly against the bottom of the cart when not in use, a slotted plate secured to and depending from the opposite or rear end of the cart, and a leg-operating rod pivotally connected at its front end to the leg below its pivot, and having its rear end passing loosely through the slotted plate and provided upon its under edge with two locking-notches, one engaging the edge of the slot when the leg is raised and the other when the same is lowered, substantially as specified.

2. The combination, with a push-cart, of a pair of angle-irons or ears secured to the under surface of the same at its front end, a bolt passed through the ears, a leg pivotally mounted on the bolt and adapted to fold up under the cart, a T-shaped arm having its head or transverse portion secured to the leg below its pivot and its shank portion projecting therefrom, an operating-rod having its front end pivoted to the extremity of the shank of the T-arm, and a slotted plate secured to the rear end of the cart and receiving and supporting the rod, said rod being provided with notches for interlocking with the lower end of the slot of the plate, substantially as specified.

3. In a hand-cart, the supplemental leg 9, pivoted to the end of the cart near the center and designed to swing inwardly, combined with the operating-rod 12, pivoted to the leg at an intermediate point by a T-shaped arm and extending back underneath the cart and beyond the inner end of the same, and devices for locking the rod in its adjustments, as set forth.

In testimony that I claim the foregoing as my own I have hereto affixed my signature in presence of two witnesses.

WALTON ALMY EDDY.

Witnesses:
JAMES BARBOUR,
HENRY JACKSON.